United States Patent
Kooima et al.

(10) Patent No.: US 12,484,485 B1
(45) Date of Patent: Dec. 2, 2025

(54) CUTTING ELEMENT WITH CONTOURED SURFACE

(71) Applicants: Philip G. Kooima, Rock Valley, IA (US); Thad De Jager, Rock Valley, IA (US); Nicholas Vande Waerdt, Rock Valley, IA (US); Nolan Den Boer, Rock Valley, IA (US); Zachary Pramann, Beresford, SD (US); Collin Borkowski, Rock Valley, IA (US)

(72) Inventors: Philip G. Kooima, Rock Valley, IA (US); Thad De Jager, Rock Valley, IA (US); Nicholas Vande Waerdt, Rock Valley, IA (US); Nolan Den Boer, Rock Valley, IA (US); Zachary Pramann, Beresford, SD (US); Collin Borkowski, Rock Valley, IA (US)

(73) Assignee: Kooima Ag, Inc., Rock Valley, IA (US)

( * ) Notice: Subject to any disclaimer, the term of this patent is extended or adjusted under 35 U.S.C. 154(b) by 561 days.

(21) Appl. No.: 17/979,396

(22) Filed: Nov. 2, 2022

(51) Int. Cl.
 *A01F 29/09* (2010.01)
(52) U.S. Cl.
 CPC .................................. *A01F 29/09* (2013.01)
(58) Field of Classification Search
 CPC .......... A01F 29/09; A01F 29/06; A01F 29/08; A01F 29/00; A01F 29/005; A01F 29/01; A01F 29/02; A01D 34/52
 USPC ............... 241/242, 222; 56/16.4 A, 500, 504
 See application file for complete search history.

(56) References Cited

U.S. PATENT DOCUMENTS

| | | | |
|---|---|---|---|
| 2,867,137 A | 1/1959 | Joy | |
| 3,635,271 A | 1/1972 | Markham | |
| 3,851,450 A | 12/1974 | Nelson | |
| 4,205,797 A | 6/1980 | Bennett, Jr. | |
| 4,298,170 A * | 11/1981 | Snavely | A01F 29/095 241/242 |
| 4,357,817 A | 11/1982 | Linsinger | |
| 4,376,793 A | 3/1983 | Jackson | |
| 4,428,260 A | 1/1984 | Eby | |
| 4,506,839 A | 3/1985 | Black | |
| 4,563,867 A | 1/1986 | Bokon | |

(Continued)

FOREIGN PATENT DOCUMENTS

| | | | | |
|---|---|---|---|---|
| DE | DD-222194 A1 * | 5/1985 | ........... | A01F 29/095 |
| DE | 19651694 A1 * | 6/1998 | ........... | A01F 29/095 |
| EP | 0022053 A1 * | 1/1981 | ............. | A01F 29/06 |

OTHER PUBLICATIONS

J. Arnold and R. Volz; "Laser Powder Technology for Cladding and Welding"; Journal of Thermal Spray Technology, pp. 243-248, vol. 8(2) Jun. 1999.

(Continued)

*Primary Examiner* — Joseph M Rocca
*Assistant Examiner* — Sunny D Webb
(74) *Attorney, Agent, or Firm* — Jeffrey A. Proehl; Woods, Fuller, Shultz & Smith P.C.

(57) ABSTRACT

A cutting system may have at least one cutting element having an inventive combination of features including a body having a first cutting edge, a first base surface extending from the first cutting edge with the body being elongated with a first end and a second end, the first cutting edge being linear and lying in a base plane, and the first base surface having contouring including undulations in the first base surface.

15 Claims, 7 Drawing Sheets

(56) References Cited

U.S. PATENT DOCUMENTS

| | | | |
|---|---|---|---|
| 4,615,734 A | 10/1986 | Spriggs | |
| 4,719,743 A | 1/1988 | Bokon | |
| 4,724,299 A | 2/1988 | Hammeke | |
| 4,896,424 A | 1/1990 | Walker | |
| 5,027,592 A | 7/1991 | Wieneke | |
| 5,160,822 A | 11/1992 | Aleshin | |
| 5,622,638 A | 4/1997 | Schell | |
| 5,884,465 A | 3/1999 | Ibach | |
| 5,979,152 A | 11/1999 | McCredie | |
| 5,997,248 A | 12/1999 | Ghasripoor | |
| 6,510,681 B2 | 1/2003 | Yang | |
| 6,571,665 B2 | 6/2003 | Julien | |
| 6,857,255 B1 | 2/2005 | Wilkey | |
| 7,043,819 B1 | 5/2006 | Arnold | |
| 7,104,883 B2 | 9/2006 | Dow | |
| 7,124,567 B1 | 10/2006 | Adamson | |
| 7,537,419 B2 | 5/2009 | Sjoberg | |
| 7,543,387 B2 | 6/2009 | Legrand | |
| 7,644,568 B2 | 1/2010 | Buchko | |
| 7,677,843 B2 * | 3/2010 | Techel | A01F 29/09 407/119 |
| 8,109,176 B1 | 2/2012 | Kooima | |
| 11,576,303 B2 * | 2/2023 | Essig | A01D 43/08 |
| 2007/0039445 A1 | 2/2007 | Nitsch | |
| 2007/0261867 A1 | 11/2007 | Techel | |
| 2010/0071216 A1 | 3/2010 | Novak | |
| 2010/0325902 A1 | 12/2010 | Dutta | |
| 2015/0013297 A1 * | 1/2015 | Bacon | A01F 29/09 56/16.4 A |

OTHER PUBLICATIONS

Steffen Nowotny et al., "Laser Beam Build-Up Welding: Precision in Repair, Surface Cladding, and Direct 3D Metal Deposition"; Journal of Thermal Spray Technology, pp. 344-348, vol. 16(3) Sep. 2007.

E. Schubert et al.; "Laser Beam Cladding: A Flexible Tool for Local Surface Treatment and Repair"; Journal of Thermal Spray Technology, pp. 590-596, vol. 8(4) Dec. 1999.

M. Lugbauer et al., "Thermal Sprayed Coatings in High-Performance Agricultural Machinery: Properties and Wear-Behaviour Test Routine", Proceedings of the 2006 International Spray Conference, pp. 1345-1350, May 2006.

\* cited by examiner

CUTTING ELEMENT WITH CONTOURED SURFACE

BACKGROUND

Field

The present disclosure relates to cutting elements and more particularly pertains to a new cutting element with contoured surface for improving the cutting of materials, such as plant materials passing through a crop harvester.

SUMMARY

In one aspect, the present disclosure relates to a cutting system which may comprise at least one cutting element having a first cutting edge. The cutting element may comprise a body having a first base surface extending from the first cutting edge, and the body may be elongated with a first end and a second end. The first cutting edge maybe linear and lie in a base plane. The first base surface may have contouring comprising undulations in the first base surface.

In another aspect, the disclosure relates to a cutting system may comprise at least one cutting element having a first cutting edge. The cutting element may comprise a body having a first base surface extending from the first cutting edge, with the body being elongated with a first end and a second end. The first cutting edge may be linear and lie in a base plane of the body. The first base surface may have contouring comprising undulations in the first base surface, and the contouring may include a plurality of peaks for contacting the material being cut, and a plurality of valleys alternating with the peaks such that each pair of adjacent peaks are separated by a valley. The contouring may be located on a medial section of the first base surface, and the first base surface may have a peripheral section located along the first cutting edge between the first cutting edge and the contouring of the medial section to space the contouring from the first cutting edge. The peripheral section may be substantially planar in the base plane.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
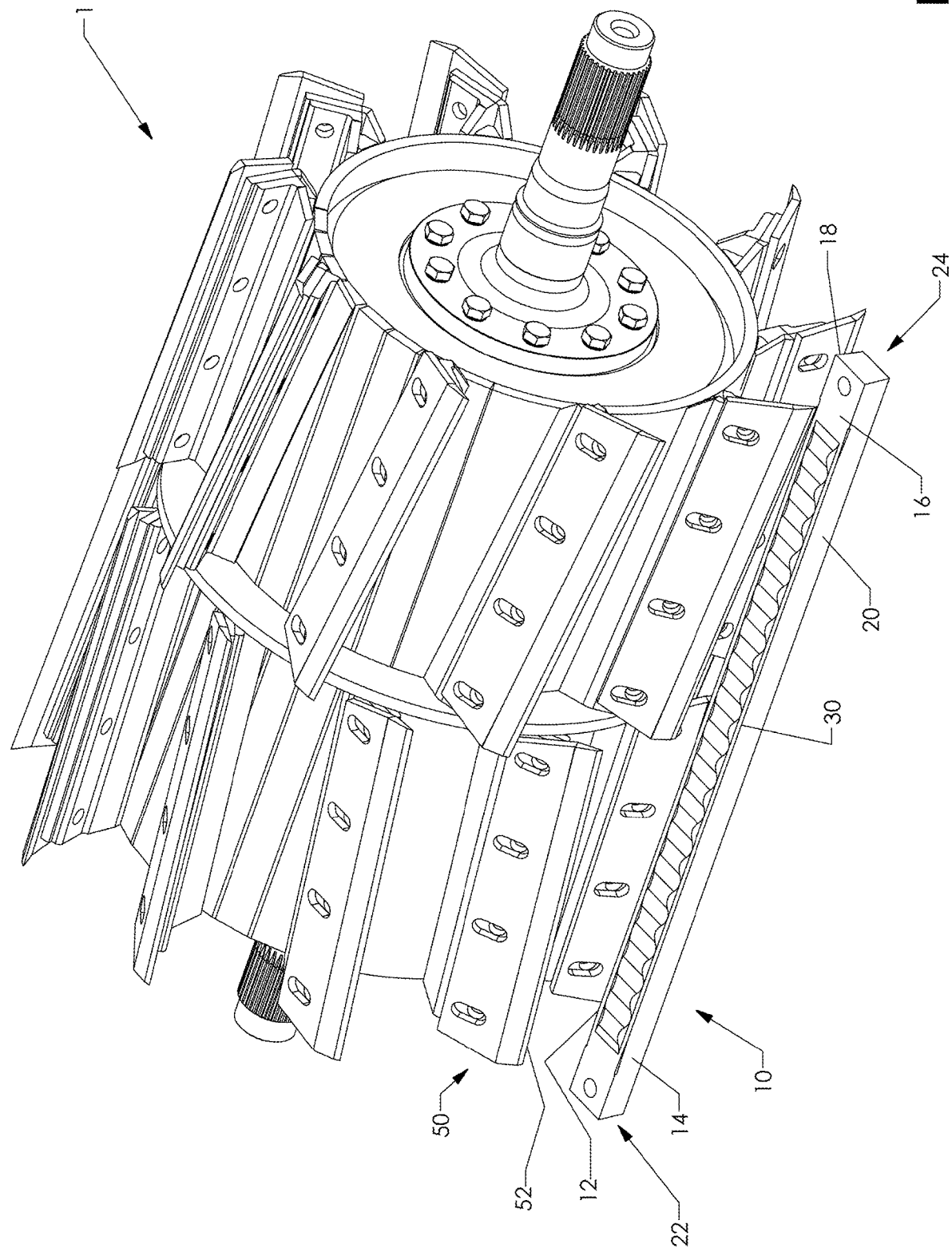
FIG. 1 is a schematic perspective view of a system including a new cutting element with contoured surface according to the present disclosure.
Figure 2:
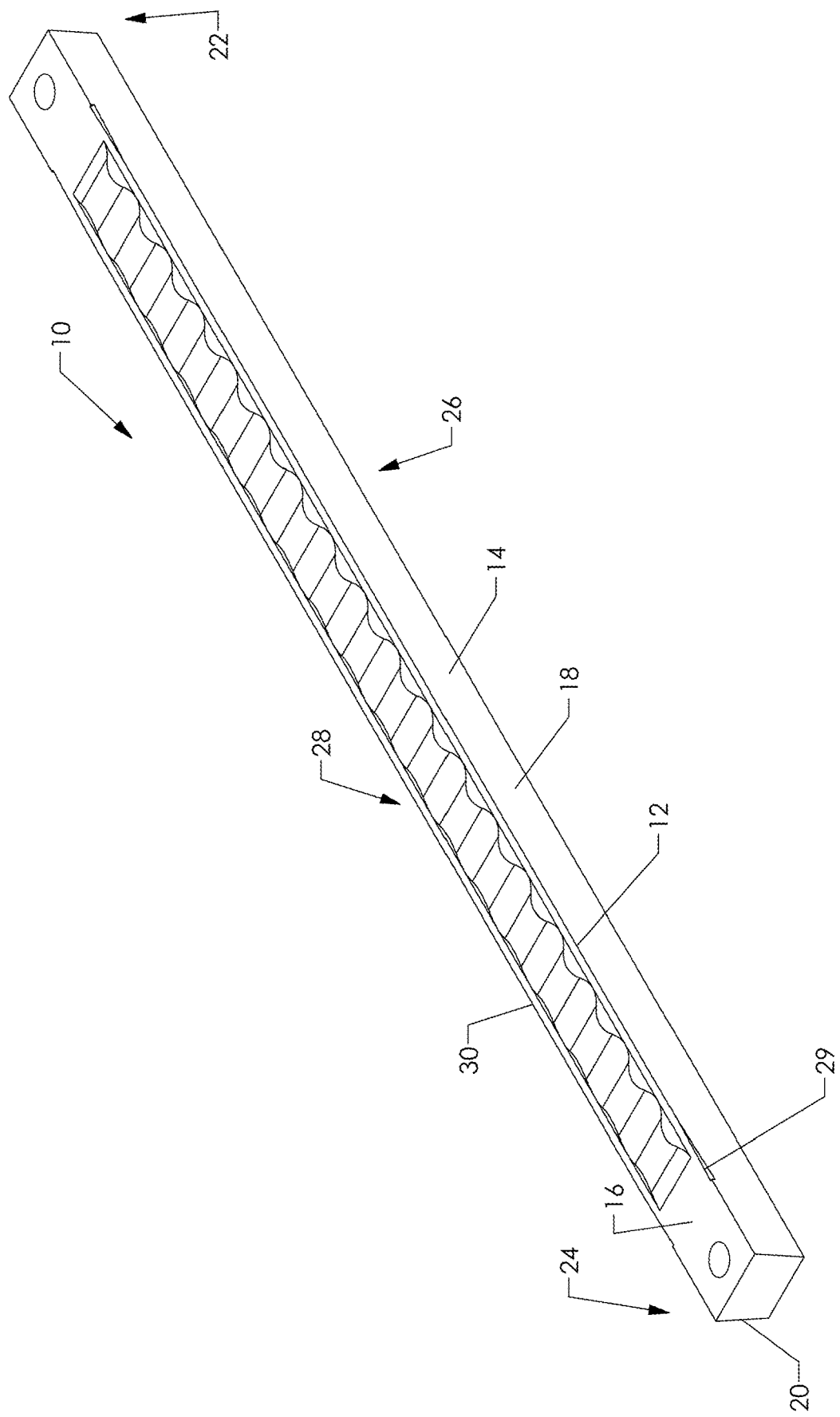
FIG. 2 is a schematic perspective view of the cutting element with contoured surface, according to an illustrative embodiment.
Figure 3:
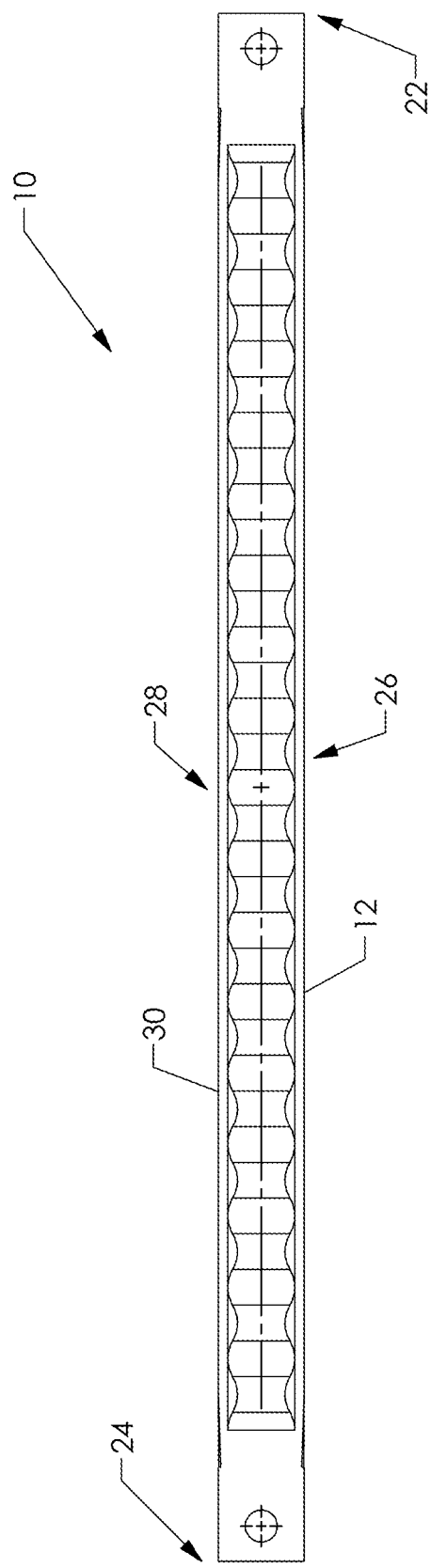
FIG. 3 is a schematic top view of the cutting element with contoured surface, according to an illustrative embodiment.
Figure 4:
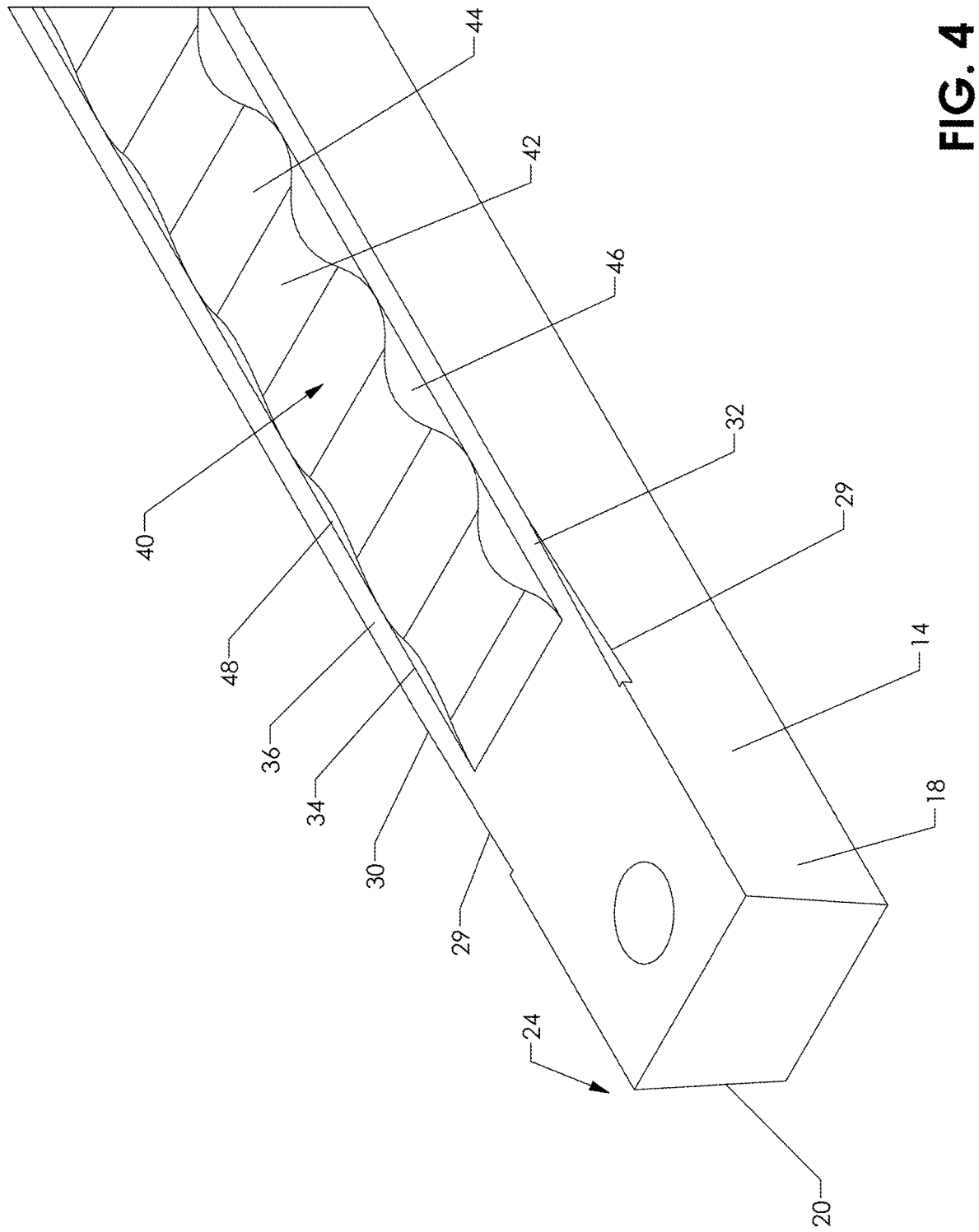
FIG. 4 is a schematic perspective view of an end portion of the cutting element with contoured surface, according to an illustrative embodiment.
Figure 5:
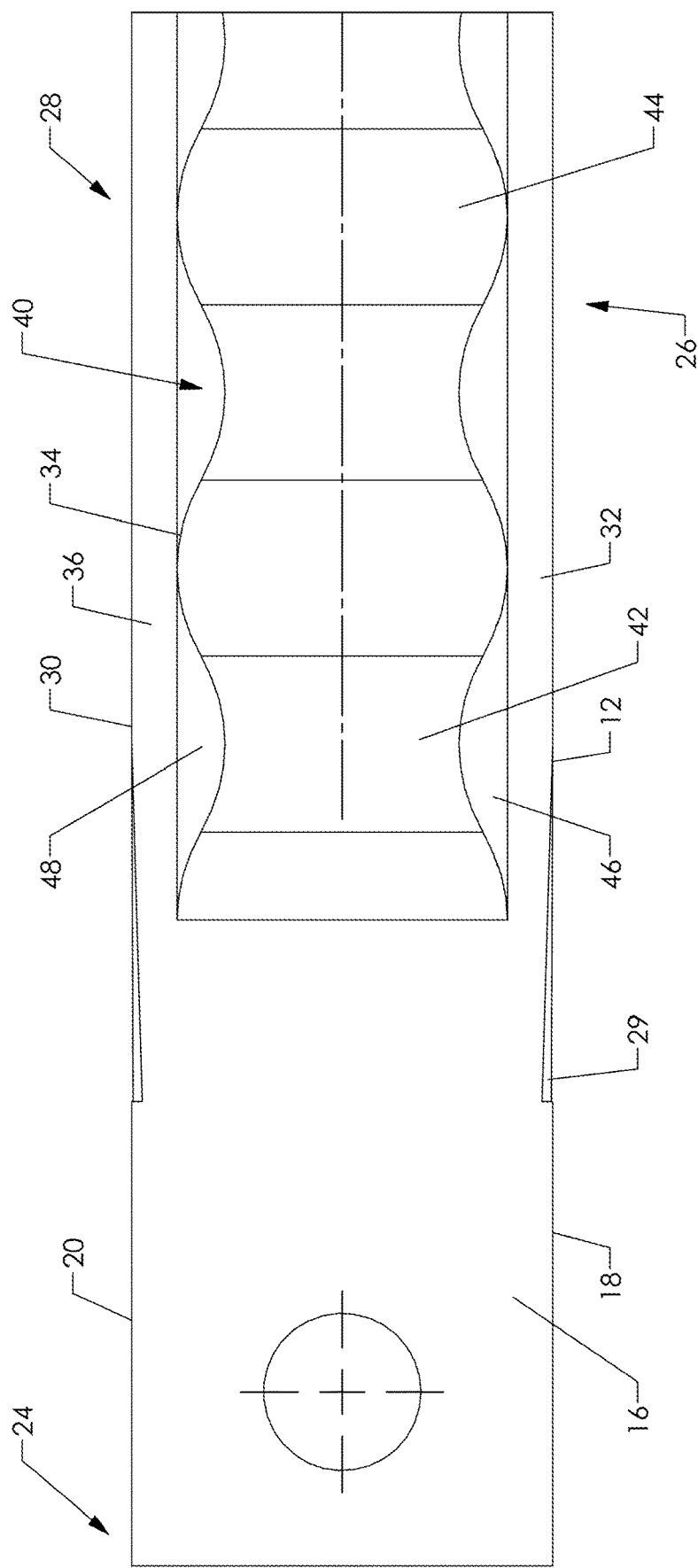
FIG. 5 is a schematic top view of the end portion of the cutting element with contoured surface, according to an illustrative embodiment.
Figure 6:
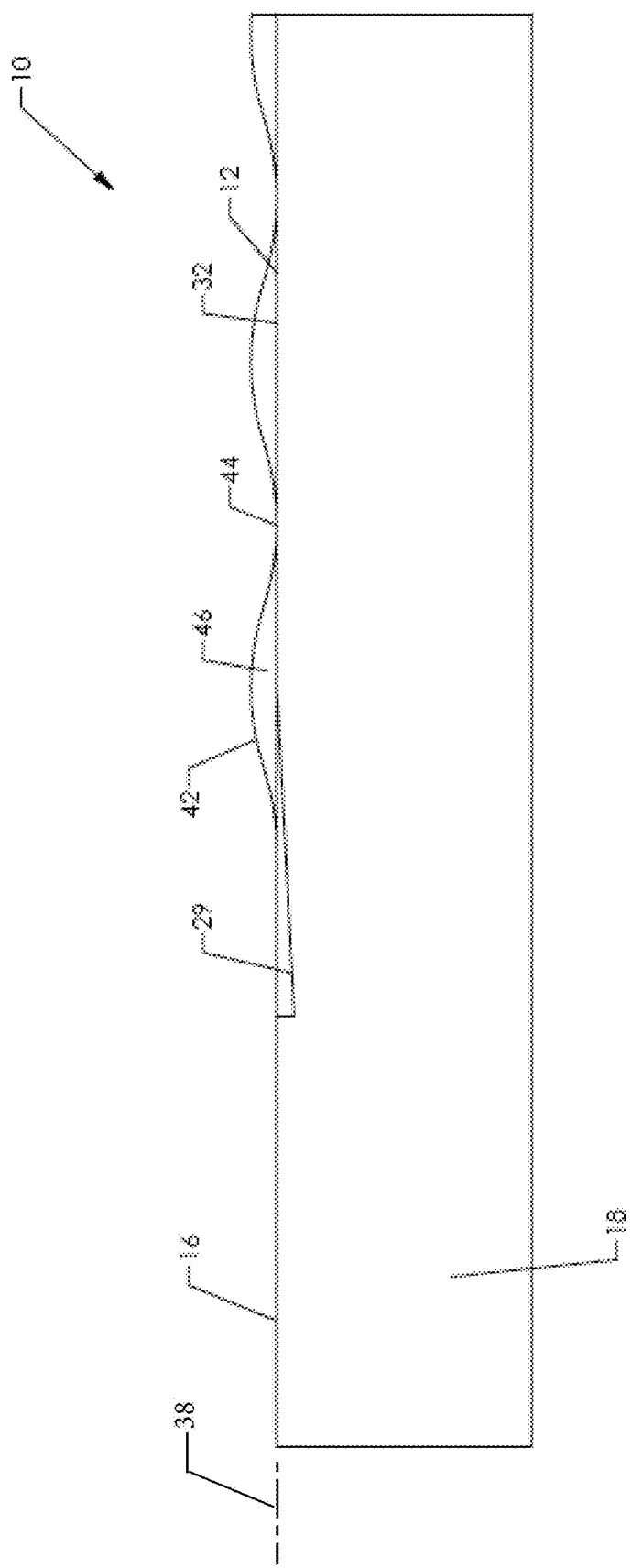
FIG. 6 is a schematic side view of the end portion of the cutting element with contoured surface, according to an illustrative embodiment.
Figure 7:
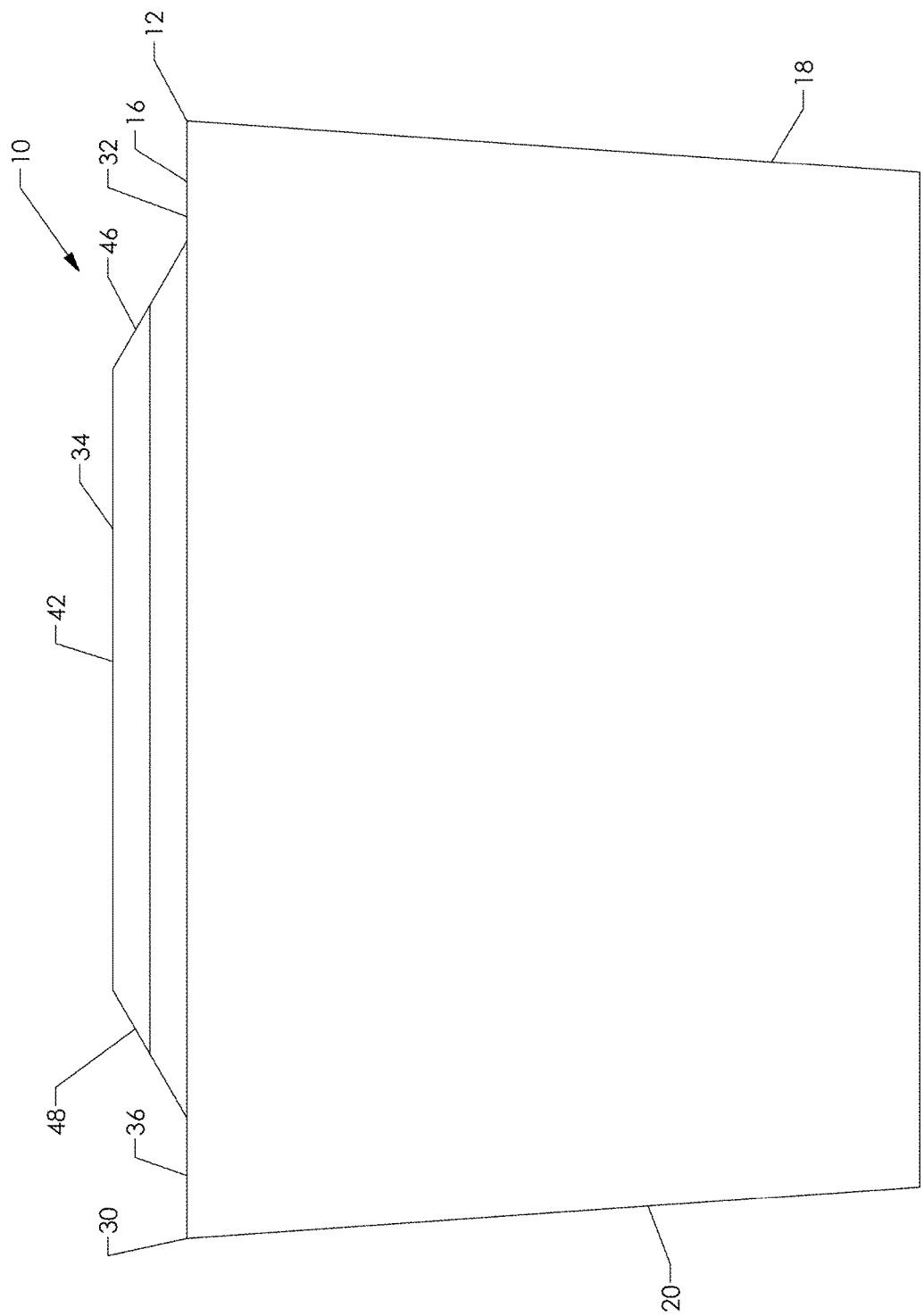
FIG. 7 is a schematic end view of the cutting element with contoured surface, according to an illustrative embodiment.

With reference now to the drawings, and in particular to FIGS. 1 through 7 thereof, a new cutting element with contoured surface embodying the principles and concepts of the disclosed subject matter will be described.

The applicants have recognized that cutting elements, such as shear bars utilized in agricultural equipment, provide the most preferable cutting results when the plant material being cut remains relatively evenly distributed across the cutting edge of the shear bar. However, the knives that contact the shear bar to cut crop materials between the knife and shear bar are typically angled with respect to the shear bar which facilitates the slicing action of the crop materials, but also tend to move the materials in a direction lateral to the direction of movement of the materials which affects the plant material throughput of the apparatus and also can cause clogging and other undesirable effects.

The applicants have also recognized that approaches that utilize shear bars with serrated cutting edges, such as that which was proposed in U.S. Pat. No. 8,109,176 to Kooima, are highly useful, and can be effective for reducing undesirable lateral movement of the plant materials. However, the applicants have also discovered that the serrated cutting edge tends to cause unusual or uneven wear on the knife having the edge moving across the cutting edge of the shear bar, potentially decreasing the life of the knife and compromising the performance of the knife.

The applicants have developed a design for a cutting element, such as a shear bar, that addresses limitations of a shear bar having a serrated cutting edge while still providing resistance to lateral movement of the plant materials being cut by the apparatus. Embodiments of the disclosure have a cutting edge which is linear to reduce or eliminate unusual wear on the cooperating knife while providing a contoured section of the surface of the bar over which the plant materials move which provides resistance to movement of the plant materials in a direction lateral to the primary direction of movement of the plant materials through the apparatus.

In embodiments, the disclosure relates to a cutting system 1 which may have a variety of applications, and an illustrative application of the system will be described in the context of a harvester apparatus in which a cutterhead with a plurality of knives rotates to move the cutting edges of the knives into contact with the cutting edge of a shear bar to cut plant materials as the plant materials are propelled across the shear bar by elements of the harvester apparatus.

The system 1 may comprise at least one cutting element, and may include a first cutting element 10 which may have a first cutting edge 12. The first cutting element 10 may comprise a body 14 which may be elongated in shape. The body 14 may have at least one base surface including a first base surface 16 which may be oriented generally parallel to the path of the plant materials moving over the cutting element 10. The body 14 may also have a second base surface 18, and the first and second base surfaces may intersect. The body may further have a third base surface 20, and the first and third base surfaces may intersect.

The elongated body 14 of the first cutting element has a first end 22 and a second end 24, and may have a first side 26 extending between the first and second ends as well as a second side 28 which also extends between the first and second ends. The second base surface 18 may be located along the first side 26 and the third base surface 20 may be located along the second side 28.

A significant feature of the first cutting element 10 may be the linear character of the first cutting edge 12 which is straight for a significant portion of the edge 12 that extends from a midpoint of the cutting element 10 outwardly towards the first 22 and second 24 ends. In embodiments, the first cutting edge 12 may be linear between the opposite first 22 and second 24 ends of the body. In some embodiments, a limited portion of the cutting edge 12 may have a slight bevel which forms a "lead-in" area 29 of the path of a knife edge beginning movement along the cutting edge. The first cutting edge 12 may be located at the intersection of the first base surface 16 and the second base surface 18. In embodiments, the plane of the first base surface and the plane of the second base surface may be oriented substantially perpendicular with respect to each other at the respective portions forming the first cutting edge 12.

The body 14 of the first cutting element may include a second edge 30 located at the intersection of the first base surface 16 and the third base surface 20, and in some embodiments the second edge may comprise a second cutting edge 30 to permit the mounting of the first cutting element in a reversed orientation on the harvester apparatus for providing additional part life. The second cutting edge 30 may be linear between the opposite first 22 and second 24 ends of the body, and may have characteristics similar to the first cutting edge 12 including, for example, the lead-in areas. The second cutting edge 30 may be located at the intersection of the first base surface 16 and the third base surface 20. The plane of the first base surface and the plane of the third base surface may be oriented substantially perpendicular with respect to each other at the respective portions forming the second cutting edge 30.

The first base surface 18 may have a peripheral section 32 which may be located along the first cutting edge 12. The peripheral section 32 may have a first peripheral width which may extend from the first cutting edge toward the second edge, and in some embodiments, the first peripheral width is substantially uniform.

The first base surface 18 may also have a medial section 34 which extends along the peripheral section 32, and may be located between the peripheral section 32 and the second edge 30. The medial section 34 has a medial width measure generally in a direction perpendicular to the first cutting edge 12.

In embodiments, the peripheral section 32 may comprise a first peripheral section 32 and the first base surface 16 may further have a second peripheral section 36 which may be located along the second edge 30. The second peripheral section 36 may be located between the medial section 34 and the second edge 30, and the second peripheral section may be bounded by the medial section and the second edge. The second peripheral section 32 may have a second peripheral width which extends from the second edge 30 toward the medial section 34, and in some embodiments, the second peripheral width is substantially uniform. In some preferred embodiments, the second peripheral width may be substantially equal to the first peripheral width to facilitate use of the cutting element 10 in a reversed orientation to utilize the second cutting edge. The first peripheral section 32 of the first base surface may be planar or substantially planar in character, such that the line of the first cutting edge lies in the same plane as the first peripheral section. Similarly, the second peripheral section 36 may be planar or substantially planar in character, such that the line of the second cutting edge lies in the same plane as the second peripheral section. The first 32 and second 36 peripheral sections of the first base surface may lie in a common base plane 38.

A further significant feature of the first cutting element 10 may be the contouring 40 of the first base surface 16. The contouring 40 may comprise undulations in the first base surface. The contouring 40 may be located on the medial section 34 of the first base surface, and may be limited to the medial section. The contouring 40 of the medial section may be positioned between the substantially planar first 32 and second 36 peripheral sections.

The contouring 40 of the first base surface may include a plurality of peaks 42 for contacting the material being cut. The plurality of peaks 42 may each protrude with respect to the base plane and the peripheral sections of the first base surface. The plurality of peaks 42 may alternate with a plurality of valleys 44 of the contouring. Consequently, each pair of adjacent peaks 42 may be separated by a valley 44, and similarly each pair of adjacent valleys 44 may be separated by a peak 42. The contouring 40 may have a sinuous profile with smooth rising-and-falling of the peaks and valleys. While the peaks 42 may protrude with respect to the base plane, in some embodiments the deepest portions of the valleys may be oriented tangential to the base plane of the peripheral sections.

The peaks 42 may extend substantially from the first peripheral section 32 to the second peripheral section 36, and in some embodiments the peaks may have a lateral taper surface 46 formed adjacent to each of the peripheral sections 32, 36 such that each of the peaks has a pair of lateral taper surfaces 46, 48 adjacent to the respective peripheral sections. The valleys 44 may extend from the first peripheral section 32, and may extend from the first peripheral section to the second peripheral section. Each of the peaks 42 may have a rounded profile with a first radius, and the first radius of each of the plurality of peaks may be substantially equal to each other. Each of the valleys 44 may have a rounded profile with a second radius, and the second radius of each of the plurality of valleys may be substantially equal to each other. Illustratively, the first radius of the peaks may be substantially equal to the second radius of the valleys.

In some implementations, the system 1 may include a second cutting element 50, and the first cutting element 10 and the second cutting element may be arranged such that the elements are movable with respect to each other. The second cutting element 50 may contact the first cutting element to cut materials positioned between the cutting elements. The second cutting element 50 may be movable while the first cutting element 10 is relatively stationary. The second cutting element 50 may have a second element cutting edge 52, and the second element cutting edge may be movable with respect to the first cutting edge of the first cutting element. In some embodiments, the second element cutting edge 52 may be angled with respect to the first cutting edge 12 of the first cutting element when mounted for use. Illustratively, the second cutting element 50 may comprise a knife. Further, in some embodiments the second cutting element 50 may comprise two or more cutting elements or knives which act with respect to the first cutting element 10.

Optionally, portions of the surface or surfaces forming the cutting edge may be provided with or coated with materials enhancing the durability of the edge and the adjacent surfaces, such as is disclosed in U.S. Pat. No. 8,109,176 to Kooima, which is hereby incorporated by reference in its entirety.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A cutting system comprising:
at least one cutting element having a first cutting edge, the cutting element comprising:
a body having a first base surface extending from the first cutting edge, the body being elongated with a first end and a second end;
wherein the first cutting edge is linear and lies in a base plane; and
wherein the first base surface has contouring comprising undulations in the first base surface, wherein the contouring has a sinuous profile with smooth rising and falling of peaks and valleys of the undulations.

2. The system of claim 1 wherein the contouring includes a plurality of peaks for contacting the material being cut, the plurality of peaks protruding with respect to the base plane.

3. The system of claim 1 wherein the plurality of valleys are tangential to the base plane.

4. The system of claim 1 wherein the first cutting edge has a medial location between the first and second ends, the first cutting edge being straight from the medial location toward the first end and being straight from the medial location toward the second end.

5. The system of claim 1 wherein the first cutting edge is straight between the opposite first and second ends of the body.

6. The system of claim 1 wherein the contouring is located on a medial section of the first base surface, the medial section of the first base surface being spaced from the first cutting edge.

7. The system of claim 6 wherein the first base surface has a peripheral section located along the first cutting edge between the first cutting edge and the contouring of the medial section of the first base surface.

8. The system of claim 7 wherein the peripheral section of the first base surface is substantially planar in the base plane.

9. The system of claim 1 wherein the body of the at least one cutting element has a second edge being spaced from the first cutting edge and extending substantially parallel to the first cutting edge.

10. The system of claim 1 wherein the peripheral section of the first base surface comprises a first peripheral section, the first base surface having a second peripheral section located along the second edge, the first and second peripheral sections being substantially planar in the base plane, a medial section of the first base surface having the contouring and being located between first and second peripheral sections.

11. The system of claim 10 wherein the contouring includes a plurality of peaks for contacting the material being cut; and
wherein the peaks extend substantially from the first peripheral section to the second peripheral section of the first base surface.

12. The system of claim 10 wherein the contouring includes a plurality of peaks for contacting the material being cut; and
wherein each of the peaks has a lateral taper surface adjacent to each of the peripheral sections of the first base surface.

13. The system of claim 10 wherein the contouring includes a plurality of peaks for contacting the material being cut and the plurality of peaks alternate with a plurality of valleys such that each pair of adjacent peaks are separated by a valley; and wherein the valleys extend in the base plane from the first peripheral section to the second peripheral section of the first base surface.

14. A cutting system comprising:
at least one cutting element having a first cutting edge, the cutting element comprising:
  a body having a first base surface extending from the first cutting edge, the body being elongated with a first end and a second end, the first cutting edge being linear and lying in a base plane of the body;
  wherein the first base surface has contouring comprising undulations in the first base surface with smooth rising and falling of peaks and valleys of the undulations, the contouring including:
    a plurality of peaks for contacting the material being cut; and
    a plurality of valleys alternating with the peaks such that each pair of adjacent peaks are separated by a valley; and
  wherein the contouring is located on a medial section of the first base surface, the first base surface having a peripheral section located along the first cutting edge between the first cutting edge and the contouring of the medial section to space the contouring from the first cutting edge, the peripheral section is substantially planar in the base plane.

15. A cutting system comprising:
at least one cutting element having a first cutting edge, the cutting element comprising:
  a body having a first base surface extending from the first cutting edge, the body being elongated with a first end and a second end, the first base surface extending from the first end to the second end of the body;
  wherein the first cutting edge is linear and lies in a base plane, the first cutting edge extending from the first and to the second end of the body; and
  wherein the first base surface has contouring comprising undulations in the first base surface with smooth rising and falling of peaks and valleys of the undulations.

\* \* \* \* \*